(12) United States Patent
Blom et al.

(10) Patent No.: US 7,231,209 B2
(45) Date of Patent: Jun. 12, 2007

(54) RADIO SYSTEM, TERMINAL DEVICE, COMPUTER PROGRAM PRODUCT, AND METHOD OF DEFINING AVAILABILITY OF QUERIED DEVICES

(75) Inventors: Jan Blom, Espoo (FI); Petri Piippo, Karkkila (FI)

(73) Assignee: Nokia Corporation, Espoo (FI)

( * ) Notice: Subject to any disclaimer, the term of this patent is extended or adjusted under 35 U.S.C. 154(b) by 55 days.

(21) Appl. No.: 11/111,579

(22) Filed: Apr. 20, 2005

(65) Prior Publication Data

US 2006/0240774 A1 Oct. 26, 2006

(51) Int. Cl.
*H04M 3/00* (2006.01)
(52) U.S. Cl. ............... 455/420; 455/418; 455/41.2; 370/469; 370/328; 709/224; 709/204
(58) Field of Classification Search ........... 455/420, 455/41.2, 418, 518; 370/469, 328; 709/224, 709/204
See application file for complete search history.

(56) References Cited

U.S. PATENT DOCUMENTS

2002/0114350 A1* 8/2002 Tang et al. ............... 370/469
2004/0003042 A1* 1/2004 Horvitz et al. ............ 709/204
2004/0198398 A1* 10/2004 Amir et al. ............... 455/456.6
2004/0236850 A1* 11/2004 Krumm et al. ............ 709/224
2005/0182962 A1* 8/2005 Given et al. .............. 713/200

* cited by examiner

*Primary Examiner*—Danh Le
(74) *Attorney, Agent, or Firm*—Hollingsworth & Funk, LLC

(57) ABSTRACT

There is provided a terminal device comprising a processing unit for controlling the functions of the terminal device, a communication unit for communicating with one or more communication devices, and a user interface. The communication unit is configured to query for nearby communication devices utilising wireless local connectivity technologies, and to detect the proximity range parameters of each queried communication device at predetermined times; the processing unit is configured to update a proximity overlap duration value of each queried communication device on the basis of the detected proximity range parameters of the queried communication devices at the predetermined times; and the user interface is configured to indicate information related to the updated proximity overlap duration values of one or more queried communication devices.

23 Claims, 2 Drawing Sheets

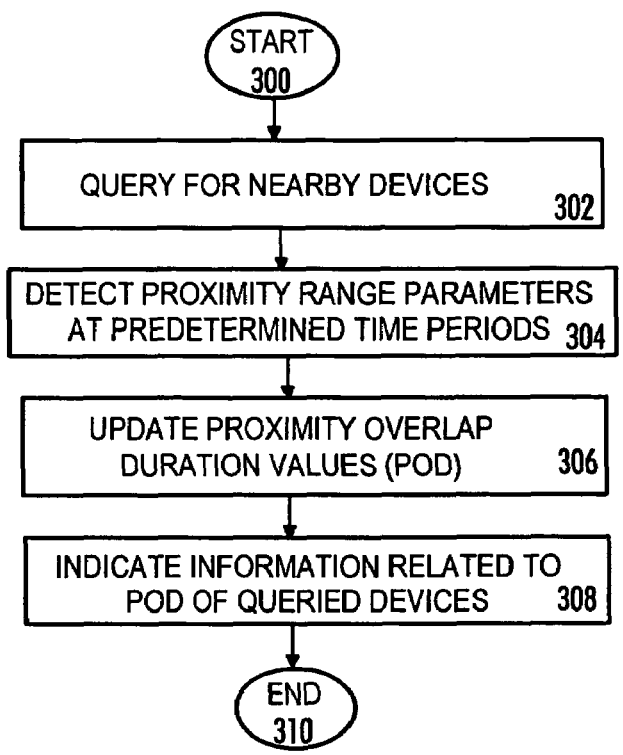
Fig. 3
| 108 DEVICE | Duration of overlap | |
|---|---|---|
| Jaakko's 3650 | 20 s - gone | 400 |
| Jim Roche | 1 min - gone | 402 |
| Darling it's me | 5 min - accessible | 404 |
| Chubbawamba | 30 min - accessible | 406 |
| Tim's IBM laptop | 2 hrs - accessible | 408 |
Fig. 4A
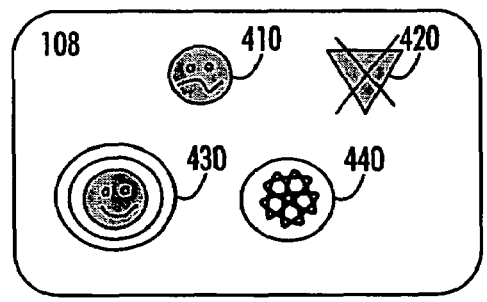
Fig. 4B

RADIO SYSTEM, TERMINAL DEVICE, COMPUTER PROGRAM PRODUCT, AND METHOD OF DEFINING AVAILABILITY OF QUERIED DEVICES

FIELD

The invention relates to a method of defining the availability of queried devices, to a radio system, terminal device, and computer program product encoding a computer program of instructions for executing a computer process for defining the availability of queried devices.

BACKGROUND

Currently existing applications that use wireless local connectivity technologies, such as Bluetooth or WLAN, enable the users to search for nearby devices in order to initiate further interaction. This kind of situation may occur, for example, when there is a need for transferring data from one's mobile phone to another user's mobile device. The results of the search are often presented as a list of all the devices found nearby. From the point of view of interacting with unknown devices or users in the proximity range, this is often insufficient as the presented information lacks details needed for making informed decisions with regard to initiating communication with the identified devices.

For example, let us consider that user A is having coffee in a bar situated along a busy pedestrian street and wishes to initiate a chat with user B, a stranger to A, in the bar. When user A executes a proximity scan for identifying users in possession of a proximity chat application, some of the devices identified can be carried by passers-by on the pedestrian street, whereas other devices can be in the possession of other users also sitting in the bar. This difference is important from the point of view of A's willingness to initiate communication since it is pointless to send a message to a device the proximity overlap duration of which with the device of user A will only be short-termed. Thus, there is a need for distinguishing between those that are passing by and those staying in the vicinity of the user A for a longer period of time.

BRIEF DESCRIPTION OF THE INVENTION

An object of the invention is to provide a method of defining the availability of queried devices, an improved radio system, an improved terminal device, and a computer program product encoding a computer program of instructions for executing a computer process for defining proximity overlap duration. According to an aspect of the invention, there is provided a method of defining availability of queried devices, the method comprising: querying, by a terminal device, for nearby communication devices utilising wireless local connectivity technologies; detecting, by the terminal device, the proximity range parameters of each queried communication device at predetermined times; updating a proximity overlap duration value of each queried communication device on the basis of the detected proximity range parameters of the queried communication devices at the predetermined times; and indicating, in the terminal device, information related to the updated proximity overlap duration values of one or more queried communication devices.

According to another aspect of the invention, there is provided a radio system comprising a terminal device and one or more communication devices utilising wireless local connectivity technologies, wherein: the terminal device is configured to query for nearby communication devices, to detect the proximity range parameters of each queried communication device at predetermined times, to update a proximity overlap duration value of each queried communication device on the basis of the detected proximity range parameters of the queried communication devices at the predetermined times, and to indicate information related to the updated proximity overlap duration values of one or more queried communication devices; and the one or more queried communication devices are configured to communicate parameter values for determining the proximity overlap duration values of the queried communication devices to the terminal device.

According to another aspect of the invention, there is provided a terminal device comprising a processing unit for controlling the functions of the terminal device, a communication unit for communicating with one or more communication devices, and a user interface, wherein the communication unit is configured to query for nearby communication devices utilising wireless local connectivity technologies, and to detect the proximity range parameters of each queried communication device at predetermined times; the processing unit is configured to update a proximity overlap duration value of each queried communication device on the basis of the detected proximity range parameters of the queried communication devices at the predetermined times; and the user interface is configured to indicate information related to the updated proximity overlap duration values of one or more queried communication devices.

According to another aspect of the invention, there is provided a computer program product encoding a computer program of instructions for executing a computer process for defining the availability of queried devices, the process comprising: querying for nearby communication devices utilising wireless local connectivity technologies; detecting the proximity range parameters of each queried communication device at predetermined times; updating a proximity overlap duration value of each queried communication device on the basis of the detected proximity range parameters of the queried communication devices at the predetermined times; and indicating information related to the updated proximity overlap duration values of one or more queried communication devices.

According to another aspect of the invention, there is provided a radio system comprising a terminal device and one or more communication devices utilising wireless local connectivity technologies, wherein: the terminal device comprises query means for querying nearby communication devices, detection means for detecting the proximity range parameters of each queried communication device at predetermined times, updating means for updating a proximity overlap duration value of each queried communication device on the basis of the detected proximity range parameters of the queried communication devices at the predetermined times, and indicating means for indicating information related to the updated proximity overlap duration values of one or more queried communication devices; and the one or more queried communication devices comprise communication means for communicating parameter values related to determining the proximity overlap duration values to the terminal device.

According to another aspect of the invention, there is provided a terminal device comprising processing means for controlling the functions of the terminal device, communication means for communicating with one or more communication devices, and user interface means, wherein the communications means query for nearby communication devices utilising wireless local connectivity technologies, and detect the proximity range parameters of each queried communication device at predetermined times; the processing means update a proximity overlap duration value of each queried communication device on the basis of the detected proximity range parameters of the queried communication devices at the predetermined times; and the user interface means indicate information related to the updated proximity overlap duration values of one or more queried communication devices.

The invention provides several advantages. It is possible to detect which nearby devices are available for proximity-based social interaction, such as chat, gaming, dating, and media sharing applications. It is also possible to easily detect which nearby devices are only passing by and which devices have been available for wireless local connectivity communications for a longer period of time.

LIST OF DRAWINGS

In the following, the invention will be described in greater detail with reference to the embodiments and the accompanying drawings, in which FIG. 1 shows an example of a radio system comprising a terminal device and nearby communication devices;

FIG. 3 illustrates a method of defining the availability of queried communication devices, and FIGS. 4A and 4B illustrate examples of the method of defining the availability of queried communication devices.

DESCRIPTION OF EMBODIMENTS

Figure 1:
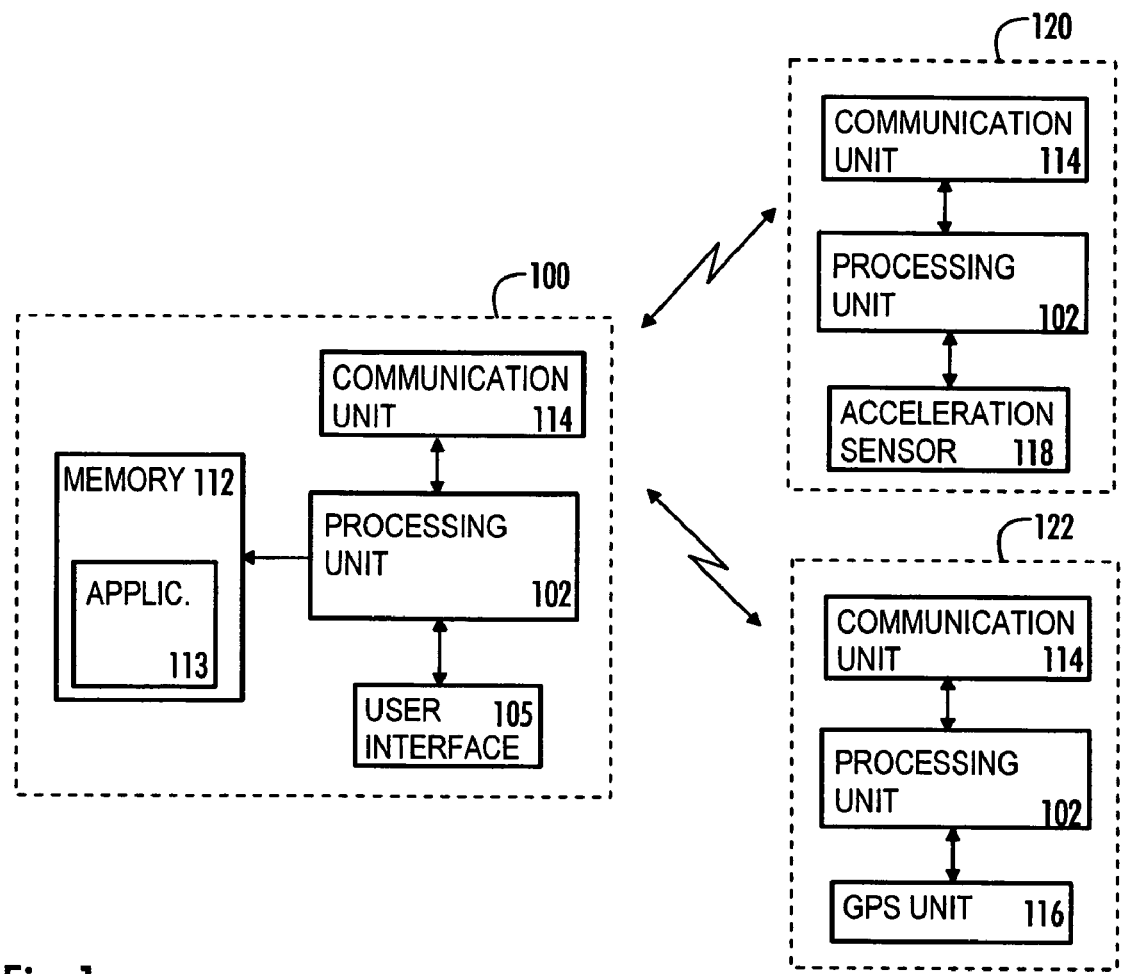

With reference to FIG. 1, let us examine an example of a radio system and terminal devices 100, 120, 122 to which embodiments of the invention can be applied. The embodiments of the invention are applicable to communications devices, such as a mobile station used as a terminal in telecommunication systems comprising one or more base stations and terminals communicating with the base stations, for example. The terminal device can be used for short-range communication implemented with a Bluetooth chip, an infrared or a WLAN connection, for example. The terminal device is, for example, a portable telephone or another device, such as a portable computer, a personal computer, a handheld computer, or a smart telephone. The terminal device may be a PDA (Personal Digital Assistant) device with or without the necessary communication means for establishing network connections.

FIG. 1 shows a block diagram of a structure of a terminal device 100. A processing unit 102, typically implemented by means of a microprocessor and software or separate components, controls the basic functions of the terminal device 100. A user interface 105 of the terminal device 100 may comprise an input device and a display. The display may even be the only user interface 105 provided in the device which enables the operation of the device to be controlled. In addition, the user interface of the terminal device 100 may include a loudspeaker and a keypad part. Depending on the type of device, there may be different user interface parts and a different number thereof.

The terminal device 100 of FIG. 1, such as a mobile station, also includes a memory 112 in which different applications run on the electronic device 100 may be stored. In an embodiment, an application 113 for defining the availability of queried communication devices is stored in the memory 112 of the device. The terminal device 100 also comprises a communication unit 114 for enabling at least short-range communication with one or more nearby communication devices 120, 122. The terminal device 100 may be implemented with a Bluetooth chip, an infrared or a WLAN connection, for example.

The other communication devices 120, 122 shown in FIG. 1 can be similar to the terminal device 100. The communication devices 120, 122 may also be other devices, such as printers, or any other devices, which employ short-range communication with nearby devices. The communication devices 120, 122 comprise at least processing units 102 and communications units 114. The devices 120, 122 of FIG. 1 may further comprise acceleration sensors 118 and/or GPS (Global Positioning System) units 116. There may also be other parts in the devices 120, 122 depending on the type of device.

In an embodiment, the communication unit 114 of the terminal device 100 is configured to query for nearby communication devices 120, 122 utilising wireless local connectivity technologies, and to detect the proximity range parameters of each queried communication device 120, 122 at predetermined times.

The processing unit 102 of the terminal device 100 is configured to update a proximity overlap duration value of each queried communication device 120, 122 on the basis of the detected proximity range parameters of the queried communication devices at the predetermined times. Further, the user interface 105 of the terminal device 100 is configured to indicate information related to the updated proximity overlap duration values of one or more queried communication devices 120, 122.

In an embodiment, the processing unit 102 is configured to update the proximity overlap duration value of each queried communication device 120, 122 by increasing the proximity overlap duration value of a particular queried communication device 120, 122 when the proximity range of the same particular queried communication device is detected more than once at the predetermined times. For example, the terminal device 100 may scan the proximity range at regular intervals, and maintain a status for the proximity overlap duration value of the communication devices detected in the proximity range. If the same communication device is detected many times, then the proximity overlap duration value of that communication device can be increased.

In an embodiment, the amount of increasing the proximity overlap duration value of the particular queried communication device depends on the number of times that the same particular queried communication device is detected at the predetermined time periods. For example, the greater the number of times a certain queried communication device 120, 122 is detected within the proximity range of the terminal device 100, the greater the extent is to which the proximity overlap duration value of this communication device is increased.

In an embodiment, the indicated information related to the updated proximity overlap duration values of one or more queried communication devices 120, 122 may comprise at least one of the following: the proximity overlap duration values of the one or more queried communication devices 120, 122, an indication on whether the proximity overlap duration of a particular queried communication device is detected to be short-termed or long-termed, an indication on which of the queried communication devices are contactable, an indication on which of the queried communication devices are out of reach. In another embodiment, the indicated information related to the updated proximity overlap duration values may comprise information about the signal strength detected from the queried communication devices. Thus, information about, for example, Bluetooth signal strength values between the terminal device and the queried communication devices can be indicated.

In an embodiment, the detected proximity range parameters comprise parameters provided by accelerator sensors 118 of one or more queried devices 120, 122, and the proximity overlap duration value of one or more queried communication devices is updated on the basis of the received parameters provided by the accelerator sensors 118. The accelerator sensors 118 allow possible movement of the queried communication devices 120, 122 to be detected and to be communicated to the terminal device 100.

In another embodiment, the detected proximity range parameters comprise parameters provided by GPS units 116 of one or more queried communication devices 120, 122, and the proximity overlap duration value of one or more queried communication devices is updated on the basis of the received parameters provided by the GPS units 116. The queried communication devices 120, 122 may then communicate their location coordinates to the terminal device 100 by using GPS. The terminal device 100 may then detect whether any given queried communication device 120, 122 has moved between the queries.

In an embodiment, the user of the terminal device 100 may launch an application 113 in the memory 112 of the device in order to start to define the availability of the communication devices 120, 122. The information related to the updated proximity overlap duration values of one or more queried communication devices 120, 122 may be shown on the user interface 105 of the terminal device 100, for example by displaying different icons representing different queried communication devices 120, 122 on a display of the user interface 105. In an embodiment, each of the icons may be displayed with a predetermined level of 'shining' effect depending on the value of the proximity overlap duration values of the queried communication devices 120, 122. Thus, an icon representing a queried communication device that has stayed within the proximity range of the terminal device for a while may be indicated with a greater level of shining than an icon representing another queried communication device that has stayed within the proximity range of the terminal device for a shorter period of time.

Figure 2:
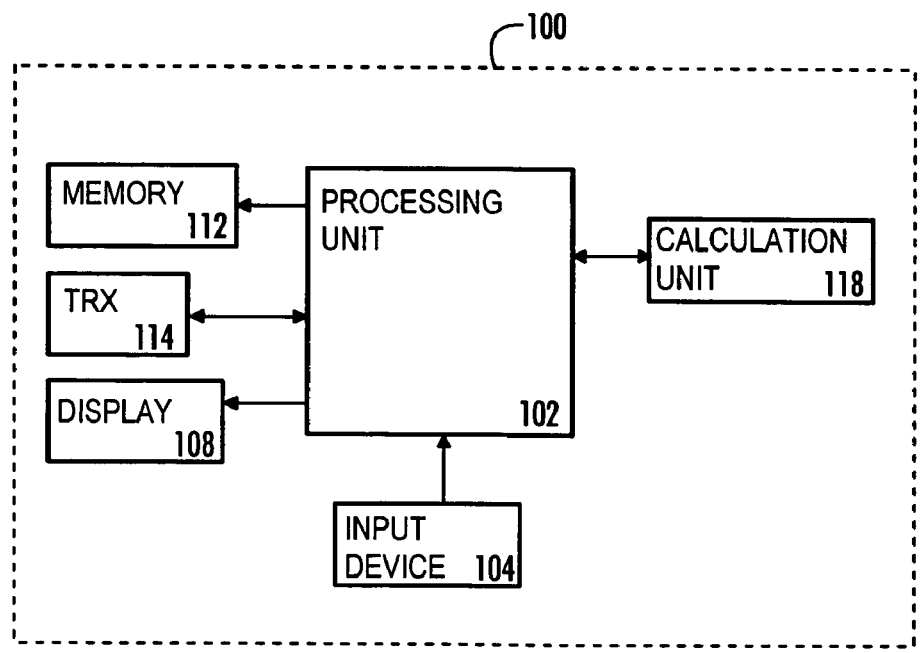
FIG. 2 illustrates an example of a terminal device.

FIG. 2 illustrates another example of a terminal device 100. The processing unit 102 controls the functions of the terminal device. The processing unit 102 receives control commands from an input device 104. The input device 104 is configured to give control commands for starting specific operations on the device or for loading given applications from a memory 112, for example. The terminal device 100 may further comprise a calculation unit 118, and a display 108.

In an embodiment, the communication unit 114 of the terminal device 100 is configured to query for nearby communication devices 120, 122 utilising wireless local connectivity technologies, and to detect the proximity range parameters of each queried communication device 120, 122 at predetermined time periods.

In an embodiment, the calculation unit 118 is configured to calculate the difference between the times of the first and the last time instants at which the proximity range parameters of a particular queried communication device 120, 122 are detected, and then the updating of the proximity overlap duration value of each queried communication device is based on the calculated time difference. In another embodiment, the calculation unit 118 is configured to calculate the number of successive detections of the proximity range parameters of a particular queried communication device 120, 122 at predetermined time periods, and the proximity overlap duration value of each queried communication device is updated based on the calculated number of successive detections.

In an embodiment, the processing unit 102 of the terminal device 100 is configured to indicate information related to the updated proximity overlap duration values of the queried communication devices 120, 122 by indicating whether the proximity overlap duration of a particular queried communication device 120, 122 is detected to be short-termed or long-termed. The processing unit 102 may indicate the information related to the updated proximity overlap duration values of one or more queried communication devices 120, 122, for example, on the display 108 of the terminal device 100. The indication about the proximity overlap duration values may, for example, be shown graphically on the display 108. The indication may further comprise sound, light, or vibration indications.

In an embodiment, the processing unit 102 is configured to indicate information related to the updated proximity overlap duration values of the queried communication devices by indicating which ones of the queried communication devices are contactable and/or which ones of the queried communication devices are out of reach.

FIG. 3 illustrates a method of defining the availability of queried devices. The method starts in 300. In 302, the terminal device queries for nearby communication devices utilising wireless local connectivity technologies. In 304, the proximity range parameters of each queried communication device are detected at predetermined times. In 306, a proximity overlap duration value of each queried communication device is updated on the basis of the detected proximity range parameters of the queried communication devices at the predetermined times. In 308, information related to the updated proximity overlap duration values of one or more queried communication devices are indicated in the terminal device. The method ends in 310.

FIGS. 4A and 4B illustrate examples of how the information related to the updated proximity overlap duration values of the one or more queried communication devices can be indicated on a display of the terminal device.

FIG. 4A illustrates a display 108 of the terminal device. The information related to the updated proximity overlap duration values of the one or more queried communication devices can be indicated by using different tables, for example. In FIG. 4A, a table comprises rows 400 to 408 in which the information related to each queried communication device may be indicated. Each row may comprise identification data about a given queried communication device and information related to the proximity overlap duration values of the same queried communication device, for example. The information may comprise more than one useful pieces of information that the user of the terminal device may be interested in. In FIG. 4A, the information comprises the duration of overlap time of the given queried communication device near the terminal device and also another piece of information indicating whether the particular queried communication device is accessible or out of reach.

FIG. 4B illustrates a display 108 of the terminal device with icons 410, 420, 430, 440 representing different queried communication devices that have been detected within the proximity range of the terminal device. FIG. 4B also illustrates a 'shining' effect that may be used to indicate the level of proximity overlap duration values of the queried communication devices. For example, the icon 410 may have just recently appeared in the proximity range of the terminal device and thus has not acquired any shining appearance yet, whereas the icons 430 and 440 have stayed within the proximity range of the terminal device for a greater period of time and have already acquired a shining appearance which is illustrated with circles around the icons in FIG. 4B. The greater level of shining appearance of an icon (i.e. two circles around icon 430) may indicate of a greater value of the proximity overlap duration value of the queried communication device related to that icon. The queried communication devices that have left the proximity range of the terminal device may also be indicated on the display 108, for example by using a crossed over icon 420.

Many different ways can be used to visualize the indication of information related to the updated proximity overlap duration values of one or more queried communication devices. The indication may be provided, for example, in the screen saver mode of the terminal device. Each detected queried communication device in the proximity may, for example, be represented by a bubble or an icon the sizes of which may grow as the proximity overlap duration values of the queried communication devices related to the specified bubbles or icons increase. In an embodiment, the presented icons or bubbles may also indicate the detected long-term and short-term proximity with their changing positions on the display of the terminal device, for example. Thus, for example, the bubbles/icons at the upper parts of the display may indicate such queried communication devices that just recently have been detected. The bubbles/icons may then move towards the bottom part of the display in relation to the time that the given bubbles/icons related to specific queried communication devices are detected to stay nearby the terminal device.

In an embodiment, the terminal device may detect that two or more given queried communication devices are engaged in "proximity chat" with each other, and information about that may also be indicated. The indication about given communication devices being engaged in the "proximity chat" with each other may be given, for example, by using overlapping bubbles or icons on the display and/or using different colours and/or sizes of the bubbles/icons.

Finally some applications of the embodiments of the invention. First, Jack, a user of a terminal device including an application for defining the availability of queried communication devices, is sitting on a park bench. He notices that there are lot of people nearby and starts wondering if any one would be up for a little chat with him. Jack opens his application to check the availability of the communication devices of the users nearby. When the application is activated, it starts to query the proximity environment for possible communication devices. When the application is on, it performs automatic queries, for example, every 30 seconds and then updates the situation on the display screen when any changes occur. When taking the first look at the display of his terminal device, Jack notices that there are four users nearby. He waits for a while as he notices that a lot of people are just passing by. After a minute or so the status on the screen is different. Shining indicates that of the four people that were detected a minute ago, two are out of reach by now and two remain in the proximity range. Icons representing the two remaining people have acquired a kind of shining appearance so as to indicate that they have remained in the proximity overlap with Jack for a while now. Jack initiates further communication with the two remaining users by using the application on his terminal device.

In another application example, let us meet Pekka, a 30 year-old single who likes to spend his free-time in bars and cafes. Pekka has an active social life but he is also always looking for new friends. When Pekka starts an application for defining the availability of queried communication devices on his terminal device, the main view of the user interface of the terminal device provides a list of users that have been in the proximity overlap with the terminal device long enough so as to start 'shining'. This way, for example people passing by the cafe can be filtered out. The list can be dynamic: users disappear and appear to the screen while the social scenery changes around Pekka. An informative alternative to the list is a 'shining' screensaver that visualizes the 'shiners' detected in the surroundings of the user. Pekka enjoys following how the 'shiner' view develops with time. In addition to detecting different mobile phones, it is also possible to detect any other communication devices, such as available printers nearby. Thus, the list can also show Pekka possible accessory devices that he may use if needed. The 'shining' effect may provide Pekka with an opportunity to add specific shiners into a buddy list (providing further functionality, such as shiner alerts, etc.), history of shiners (organized on a calendar), love points feature (lists of most frequently encountered shiners). Additionally, shining may provide a natural gateway to proximity chat and the list of shiners can be complemented with information on the ones who are hosting a chat session, for example.

Even though the invention is described above with reference to an example according to the accompanying drawings, it is clear that the invention is not restricted thereto but can be modified in several ways within the scope of the appended claims.

The invention claimed is:

1. A method of defining the availability of queried devices, the method comprising:
    querying for nearby communication devices utilizing wireless local connectivity technologies;
    detecting the proximity range parameters of each queried communication device at predetermined times; and
    increasing a proximity overlap duration value of a particular queried communication device when the proximity range of the same particular queried communication device is detected more than once on the basis of the detected proximity range parameters of the queried communication devices at the predetermined times.

2. The method of claim 1, wherein the amount of increasing the proximity overlap duration value of the particular queried communication device depends on the number of times that the same particular queried communication device is detected at predetermined times.

3. The method of claim 1, the method further comprising calculating the difference between the times of the first and the last time instants at which the proximity range parameters of the particular queried communication device are detected, and the step of increasing the proximity overlap duration value of the particular queried communication device being further based on the calculated time difference.

4. The method of claim 1, the method further comprising calculating the number of successive detections of the proximity range parameters of the particular queried communication device at predetermined time periods, and the step of increasing the proximity overlap duration value being further based on the calculated number of successive detections.

5. The method of claim 1, further comprising indicating information related to the increased proximity overlap duration values of the queried communication devices including indicating whether the proximity overlap duration of the particular queried communication device is detected to be short-termed or long-termed.

6. The method of claim 1, further comprising indicating information related to the increased proximity overlap duration values of the queried communication devices including indicating which queried communication devices are contactable.

7. The method of claim 1, further comprising indicating information related to the increased proximity overlap duration values of the queried communication devices including indicating which queried communication devices are out of reach.

8. The method of claim 1, wherein the detected proximity range parameters comprise parameters provided by accelerator sensors of one or more queried communication devices, and the proximity overlap duration value of one or more queried communication devices is updated on the basis of the received parameters provided by the accelerator sensors.

9. The method of claim 1, wherein the detected proximity range parameters comprise parameters provided by GPS units of one or more queried communication devices, and the proximity overlap duration value of one or more queried communication devices is updated on the basis of the received parameters provided by the GPS units.

10. A radio system comprising a terminal device and one or more communication devices utilizing wireless local connectivity technologies, wherein:
the terminal device is configured to query for nearby communication devices, to detect the proximity range parameters of each queried communication device at predetermined times, and to increase a proximity overlap duration value of a particular queried communication device when the proximity range of the same particular queried communication device is detected more than once on the basis of the detected proximity range parameters of the queried communication devices at the predetermined times; and
the one or more queried communication devices are configured to communicate parameter values for determining the proximity overlap duration values of the queried communication devices to the terminal device.

11. The radio system of claim 10, wherein the amount of increasing the proximity overlap duration value of the particular queried communication device depends on the number of times that the same particular queried communication device is detected at predetermined times.

12. The radio system of claim 10, wherein the terminal device is further configured to calculate the difference between the times of the first and the last time instants at which the proximity range parameters of the particular queried communication device are detected, and to increase the proximity overlap duration value of the particular queried communication device on the basis of the calculated time difference.

13. The radio system of claim 10, wherein the terminal device is further configured to calculate the number of successive detections of proximity range parameters of a particular queried communication device at predetermined time periods, and to update the proximity overlap duration value of each queried communication device on the basis of the calculated number of successive detections.

14. The radio system of claim 10, wherein the terminal device is configured to indicate information related to the increased proximity overlap duration values of the queried communication devices by indicating whether the proximity overlap duration of a particular queried communication device is detected to be short-termed or long-termed.

15. The radio system of claim 10, wherein the detected proximity range parameters comprise parameters provided by accelerator sensors of one or more queried communication devices, and the terminal device is configured to update the proximity overlap duration value of one or more queried communication devices on the basis of the received parameters provided by the accelerator sensors.

16. The radio system of claim 10, wherein the detected proximity range parameters comprise parameters provided by GPS units of one or more queried communication devices, and the terminal device is configured to update the proximity overlap duration value of one or more queried communication devices on the basis of the received parameters provided by the GPS units.

17. A terminal device comprising a processing unit for controlling the functions of the terminal device, a communication unit for communicating with one or more communication devices, and a user interface, wherein the communication unit is configured to query for nearby communication devices utilizing wireless local connectivity technologies, and to detect the proximity range parameters of each queried communication device at predetermined times; and the processing unit is configured to increase a proximity overlap duration value of a particular queried communication device when the proximity range of the same particular queried communication device is detected more than once on the basis of the detected proximity range parameters of the queried communication devices at the predetermined times.

18. The terminal device of claim 17, wherein the processing unit is further configured to calculate the difference between the times of the first and the last time instants at which the proximity range parameters of the particular queried communication device are detected, and to increase the proximity overlap duration value of each the particular queried communication device on the basis of the calculated time difference.

19. The terminal device of claim 17, wherein the processing unit is further configured to calculate the number of successive detections of the proximity range parameters of a particular queried communication device at predetermined time periods, and to update the proximity overlap duration value of each queried communication device on the basis of the calculated number of successive detections.

20. The terminal device of claim 17, wherein the processing unit is further configured to indicate information related to the increased proximity overlap duration values of the queried communication devices by indicating whether the proximity overlap duration of a particular queried communication device is detected to be short-termed or long-termed.

21. A computer program product encoding a computer program of instructions for executing a computer process for defining the availability of queried devices, the process comprising:
querying for nearby communication devices utilizing wireless local connectivity technologies;
detecting the proximity range parameters of each queried communication device at predetermined times; and
increasing a proximity overlap duration value of a particular queried communication device when the proximity range of the same particular queried communication device is detected more than once on the basis of the detected proximity range parameters of the queried communication devices at the predetermined times.

22. A radio system, comprising a terminal device and one or more communication devices utilizing wireless local connectivity technologies, wherein:

the terminal device comprises query means for querying nearby communication devices, detection means for detecting the proximity range parameters of each queried communication device at predetermined times, and increasing means for increasing a proximity overlap duration value of a particular queried communication device when the proximity range of the same particular queried communication device is detected more than once on the basis of the detected proximity range parameters of the queried communication devices at the predetermined times; and the one or more queried communication devices comprise communication means for communicating parameter values related to determining the proximity overlap duration values to the terminal device.

23. A terminal device comprising processing means for controlling the functions of the terminal device, communication means for communicating with one or more communication devices, and user interface means, wherein the communications means query for nearby communication devices utilizing wireless local connectivity technologies, and detect the proximity range parameters of each queried communication device at predetermined times; and the processing means increase a proximity overlap duration value of a particular queried communication device when the proximity range of the same particular queried communication device is detected more than once on the basis of the detected proximity range parameters of the queried communication devices at the predetermined times.

* * * * *

UNITED STATES PATENT AND TRADEMARK OFFICE
CERTIFICATE OF CORRECTION

PATENT NO. : 7,231,209 B2 Page 1 of 1
APPLICATION NO. : 11/111579
DATED : June 12, 2007
INVENTOR(S) : Jan Blom It is certified that error appears in the above-identified patent and that said Letters Patent is hereby corrected as shown below:

Claim 18, at column 10, line 41: "of each the" should read --of the--.

Signed and Sealed this

Seventh Day of August, 2007

JON W. DUDAS
*Director of the United States Patent and Trademark Office*